(12) United States Patent
Honma et al.

(10) Patent No.: US 10,577,735 B2
(45) Date of Patent: Mar. 3, 2020

(54) SKIN MATERIAL AND CONVEYANCE SEAT

(71) Applicant: TS TECH CO., LTD., Saitama (JP)

(72) Inventors: Yuichi Honma, Tochigi (JP); Tatsuro Ogawa, Tochigi (JP); Takashi Kojima, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 61 days.

(21) Appl. No.: 15/872,420

(22) Filed: Jan. 16, 2018

(65) Prior Publication Data

US 2018/0230632 A1    Aug. 16, 2018

(30) Foreign Application Priority Data

Feb. 15, 2017 (JP) ................................ 2017-026228

(51) Int. Cl.
| | |
|---|---|
| *B60N 2/58* | (2006.01) |
| *B60N 2/70* | (2006.01) |
| *D05B 21/00* | (2006.01) |
| *D04H 5/03* | (2012.01) |
| *D04H 5/06* | (2006.01) |
| *D04H 3/105* | (2012.01) |
| *D05B 1/02* | (2006.01) |
| *D06C 7/00* | (2006.01) |
| *D06C 15/00* | (2006.01) |

(Continued)

(52) U.S. Cl.
CPC ........... *D05B 21/00* (2013.01); *B60N 2/5891* (2013.01); *D04H 3/105* (2013.01); *D04H 5/03* (2013.01); *D04H 5/06* (2013.01); *D05B 1/02* (2013.01); *D05B 29/06* (2013.01); *D06C 7/00* (2013.01); *D06C 15/00* (2013.01); *D06C 29/005* (2013.01); *D10B 2505/08* (2013.01); *D10B 2505/12* (2013.01)

(58) Field of Classification Search
CPC .............. A43B 23/026; A43B 23/0235; A43B 23/0245; B32B 5/024; B32B 7/12; B32B 2262/0276; B32B 5/022; A41D 2500/10; A41D 31/00
See application file for complete search history.

(56) References Cited

U.S. PATENT DOCUMENTS

| | | | | |
|---|---|---|---|---|
| 2,099,503 | A | * 11/1937 | Swett | ......................... B62J 1/00 |
| | | | | 297/214 |
| 2,520,787 | A | * 8/1950 | Sherman | ................ A47H 13/14 |
| | | | | 223/30 |

(Continued)

FOREIGN PATENT DOCUMENTS

| | | |
|---|---|---|
| JP | 3896018 B2 | 3/2007 |
| JP | 3915031 B2 | 5/2007 |
| JP | 4274808 B2 | 6/2009 |

*Primary Examiner* — Shin H Kim
(74) *Attorney, Agent, or Firm* — Michael Best & Friedrich LLP

(57) ABSTRACT

It is intended to improve texture of a decoration using a stitch line while improving workability in sewing for forming the stitch line at a skin material, to promote manufacturing efficiency as compared to formation of a stepped shape only by sewing, and to reduce the number of steps. A skin material is used for a conveyance seat, and is molded using a die. The skin material includes a linearly-extending stepped portion having a stepped shape transferred from the die, and a stitch line sewn along the stepped portion. The stepped portion serves as a guide upon formation of the stitch line.

14 Claims, 4 Drawing Sheets

(51) Int. Cl.
*D06C 29/00* (2006.01)
*D05B 29/06* (2006.01)

(56) References Cited

U.S. PATENT DOCUMENTS

| | | | | |
|---|---|---|---|---|
| 2,565,662 A * | 8/1951 | McMahon | ............. | A43B 13/40 |
| | | | | 36/19 R |
| 4,541,885 A * | 9/1985 | Caudill, Jr. | ......... | B29C 66/1122 |
| | | | | 156/220 |
| 5,611,144 A * | 3/1997 | Gusky | ................... | A44C 5/025 |
| | | | | 29/896.411 |
| 6,004,498 A * | 12/1999 | Fujii | .................. | B29C 37/0057 |
| | | | | 264/255 |
| 6,390,593 B1 * | 5/2002 | DeRoos | .............. | B41J 2/16508 |
| | | | | 347/29 |
| 6,660,195 B2 * | 12/2003 | Usui | ...................... | B29C 44/14 |
| | | | | 264/46.4 |
| 6,861,020 B2 * | 3/2005 | Hashiba | ................ | B29C 43/203 |
| | | | | 264/46.4 |
| 8,025,959 B2 * | 9/2011 | Hashiba | ................... | B32B 5/18 |
| | | | | 428/300.7 |
| 8,071,002 B2 * | 12/2011 | Boyer | ............... | B29C 45/14811 |
| | | | | 264/259 |
| 8,530,028 B2 * | 9/2013 | Smith | .................... | B29C 43/18 |
| | | | | 428/102 |
| 10,259,361 B2 * | 4/2019 | Bourde | ................ | B60N 2/5883 |
| 2001/0016255 A1 * | 8/2001 | Usui | ................... | B29C 44/0415 |
| | | | | 428/318.6 |
| 2003/0052430 A1 * | 3/2003 | Hashiba | ................ | B29C 43/203 |
| | | | | 264/46.4 |
| 2006/0177620 A1 * | 8/2006 | Gray | ...................... | B29C 65/02 |
| | | | | 428/57 |
| 2007/0210484 A1 * | 9/2007 | Fantin | .................... | B29C 43/18 |
| | | | | 264/259 |
| 2010/0171333 A1 * | 7/2010 | Smith | .................... | B29C 43/18 |
| | | | | 296/1.08 |
| 2010/0323182 A1 * | 12/2010 | Hashiba | .................... | B32B 5/18 |
| | | | | 428/297.4 |
| 2016/0325173 A1 * | 11/2016 | Leary | ................... | A63B 71/141 |
| 2017/0080839 A1 * | 3/2017 | Bourde | ................ | B60N 2/5883 |
| 2018/0021168 A1 * | 1/2018 | Isaac | ........................ | A61F 7/02 |
| 2018/0230632 A1 * | 8/2018 | Honma | .................. | D05B 21/00 |
| 2018/0317606 A1 * | 11/2018 | Schneider | ............... | A43B 9/20 |

* cited by examiner

SKIN MATERIAL AND CONVEYANCE SEAT

CROSS REFERENCE TO RELATED APPLICATIONS

This application is based on and claims the benefit of priority from the prior Japanese Patent Application JP 2017-026228, filed on Feb. 15, 2017, the entire contents of which are incorporated herein by reference.

BACKGROUND OF THE INVENTION

Field of the Invention

The present invention relates to a skin material and a conveyance seat. In particular, the present invention relates to a skin material including a portion having a stepped shape transferred from a die and a stitch line sewn along the portion, and also relates to a conveyance seat including the skin material.

Description of the Related Art

The method for molding a skin material of a conveyance seat includes, for example, a method in which a press die onto which a seam or emboss pattern is transferred is used to press skin material original fabric against a pattern portion of the press die to mold a skin material onto which the pattern is transferred.

For example, Japanese Patent No. 4274808 (hereinafter referred to as "Patent Literature 1") discloses a skin material having a pattern transferred from a press die. More specifically, the transferred pattern of the skin material disclosed in Patent Literature 1 is a sewing thread pattern, and a base portion of such a pattern is an undercut portion.

Moreover, Japanese Patent No. 3896018 (hereinafter referred to as "Patent Literature 2") discloses the device and method for transferring a stitch pattern (stitch design) from a die to a skin material to manufacture a seat covered with the skin material.

Further, Japanese Patent No. 3915031 (hereinafter referred to as "Patent Literature 3") discloses a skin material molding method in light of the following points: it is difficult to form a pattern transferred from a die as a colored thread-shaped pattern with high quality of texture. More specifically, in the skin material molding method disclosed in Patent Literature 3, a stitch formation target portion is formed by transferring from the die to a skin material, and a new stitch is provided using a sewing thread along the stitch formation target portion.

According to the techniques disclosed in Patent Literatures 1 to 3, the pattern can be transferred from the die to the skin material. Moreover, according to the skin material molding method of Patent Literature 3, the sewing thread is used to form a stitch line at the skin material in addition to the transferred pattern, and therefore, high quality of texture can be provided to the skin material.

SUMMARY OF THE INVENTION

However, in the skin material molding method described in Patent Literature 3, it is difficult to sew the sewing thread along the stitch formation target portion formed by transferring from the die.

Specifically, in a case where the recessed-raised interval of the stitch formation target portion formed at the die and the interval of actual seams formed by a sewing machine upon formation of the new stitch are different from each other, strain in a thickness direction of the skin material and a direction perpendicular to the thickness direction might be caused at the stitch line due to reactive force applied upon sewing.

In the case where the strain in the thickness direction of the skin material is caused at the stitch line, the stitch line tends to be caught by the buttocks or inner thighs of a person seated on a seat using the skin material, and for this reason, a feeling of discomfort might be provided to the seated person.

For this reason, the process of adjusting the delivering speed of the sewing machine upon formation of the new stitch in accordance with the recessed-raised interval of the stitch formation target portion is necessary, for example. This leads to low workability and an extra number of steps.

Moreover, water might enter a cushion pad through sewing holes formed by formation of the stitch by means of the sewing thread. In this case, the buttocks or inner thighs of the seated person might get wet.

The present invention has been made in view of the above-described problems, and an objective of the present invention is to improve texture of a decoration using a stitch line while improving workability in sewing for forming the stitch line at a skin material, to promote manufacturing efficiency as compared to formation of a stepped shape only by sewing, and to reduce the number of steps.

Moreover, another object of the present invention is to suppress the buttocks or inner thighs of a seated person on a conveyance seat from catching the stepped shape or the stitch line, thereby providing a favorable feeling of seating to the seated person.

Further, still another object of the present invention is to reduce water entrance into the conveyance seat through sewing holes, thereby preventing the buttocks or the inner thighs from getting wet due to water entrance.

In addition, it is also intended to accomplish the above-described goals in the conveyance seat.

The above-described problems are solved by a skin material of the present invention. Such a skin material is a skin material used for a conveyance seat and molded using a die. The skin material includes a linearly-extending transferred extension having a stepped shape transferred from the die, and a stitch line sewn along the transferred extension. The transferred extension serves as a guide upon formation of the stitch line.

According to the above-described configuration, the stitch line is formed along the transferred extension having the transferred stepped shape. Thus, the transferred extension can be used as the guide to form the stitch line. Consequently, texture of a decoration can be improved as compared to the case of forming a stitch line pattern by transferring while workability in sewing for forming the stitch line at the skin material can be improved. Moreover, manufacturing efficiency can be promoted as compared to formation of a stepped shape only by sewing, and the number of steps can be reduced.

The thickness of the transferred extension and the periphery thereof is preferably a constant thickness.

According to the above-described configuration, the thickness of the transferred extension having the transferred shape and the periphery thereof is the constant thickness. Unlike the case of forming the stepped shape by sewing, no thick portion is caused due to overlapping of sewn skin pieces. Thus, only the stepped shape can be clearly seen. Consequently, it is less likely that the stepped shape is caught by the buttocks or inner thighs of a seated person, leading to a favorable feeling of seating of the seated person. Further, as compared to the case of forming the stepped shape by sewing, no seam allowance is necessary, and the amount of the skin material to be discarded can be reduced. This can lead to a favorable yield ratio of the skin material.

The transferred extension may be formed in the vicinity of a standing wall of the conveyance seat.

According to the above-described configuration, the transferred extension is formed in the vicinity of the standing wall. Thus, the transferred extension in the stepped shape can be more sterically seen, leading to a higher design effect.

The stitch line may be formed on one side with respect to the transferred extension.

According to the above-described configuration, the stitch line can be easily formed in such a stable shape that only one side with respect to the transferred extension has a planar shape, for example. Thus, workability in formation of the stitch line can be enhanced.

The stitch line is preferably formed at a portion formed continuously to a lower side of the stepped shape of the transferred extension.

According to the above-described configuration, the stitch line is formed at the portion formed continuously to the lower side of the stepped shape of the transferred extension, and therefore, it is less likely that the stitch line is caught by the buttocks or inner thighs of the seated person on the conveyance seat.

The skin material may include a seal material configured to cover, from a back side, a sewing hole formed by the stitch line.

According to the above-described configuration, water entrance into the conveyance seat through the sewing hole can be reduced by the seal material such as a tape, and this can prevent the buttocks or the inner thighs from getting wet due to water entrance.

The seal material preferably covers the stitch line to extend over the transferred extension.

According to the above-described configuration, the seal material extends over the transferred extension in the stepped shape. Thus, a contact area between the seal material and a back surface of the skin material can be increased, leading to higher adhesive force. This can reduce detachment of the seal material from the back surface of the skin material, and therefore, water entrance into the conveyance seat can be stably reduced.

The conveyance seat may include the above-described skin material.

According to the above-described configuration, the above-described problems are solved in the conveyance seat.

According to the skin material of the present invention, the texture of the decoration can be improved as compared to the case of forming the stitch line pattern by transferring while the workability in sewing for forming the stitch line at the skin material can be improved. Moreover, the manufacturing efficiency can be promoted as compared to formation of the stepped shape only by sewing, and the number of steps can be reduced.

Moreover, only the stepped shape can be clearly seen, and a favorable yield ratio of the skin material can be provided.

Further, the transferred extension in the stepped shape can be more sterically seen, leading to the higher design effect.

In addition, the workability in formation of the stitch line can be enhanced.

Moreover, it is less likely that the stepped shape or the stitch line is caught by the buttocks or inner thighs of the seated person on the conveyance seat.

Further, water entrance into the conveyance seat through the sewing hole can be reduced by the seal material such as the tape, and this can prevent the buttocks or the inner thighs from getting wet due to water entrance.

In addition, the contact area between the seal material and the back surface of the skin material can be increased, leading to higher adhesive force. This can reduce detachment of the seal material from the back surface of the skin material, and therefore, water entrance into the conveyance seat can be stably reduced.

Moreover, the conveyance seat can also have the above-described advantageous effects.

DETAILED DESCRIPTION

A specific embodiment (hereinafter referred to as a "present embodiment") of the present invention will be described below with reference to the drawings. Note that the embodiment described below will be set forth merely as an example for the sake of easy understanding of the present invention, and is not intended to limit the present invention. That is, changes and modifications can be made to the present invention without departing from the gist of the present invention, and needless to say, the present invention includes equivalents thereof.

Note that in description below, a front-to-back direction means a front-to-back direction when viewed from a person seated on a conveyance seat, i.e., a direction coincident with a travelling direction of a conveyance, and is also referred to as a "seat front-to-back direction." A width direction means a right-to-left direction of the conveyance seat, and is also referred to as a "seat width direction." A height direction means a height direction of the conveyance seat, and in a precise sense, an upper-to-lower direction when the conveyance seat is viewed from the front.

<Configuration of Conveyance Seat>

An entire configuration of a seat 1 used for a motorcycle, a tricycle, etc. according to the present embodiment of the present invention will be described with reference to FIGS. 1 and 2.

Figure 1:
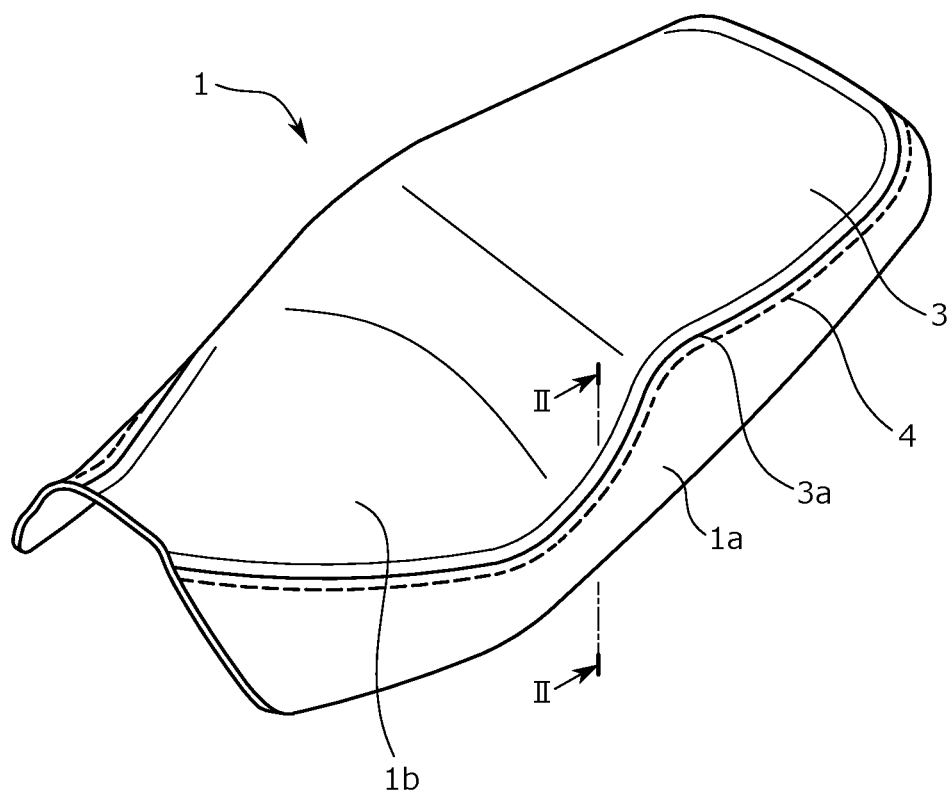
FIG. 1 is a perspective view of a seat according to an embodiment of the present invention, the seat including a skin material with a stepped portion formed by transferring from a die and a stitch line formed by a sewing thread.
Figure 2:
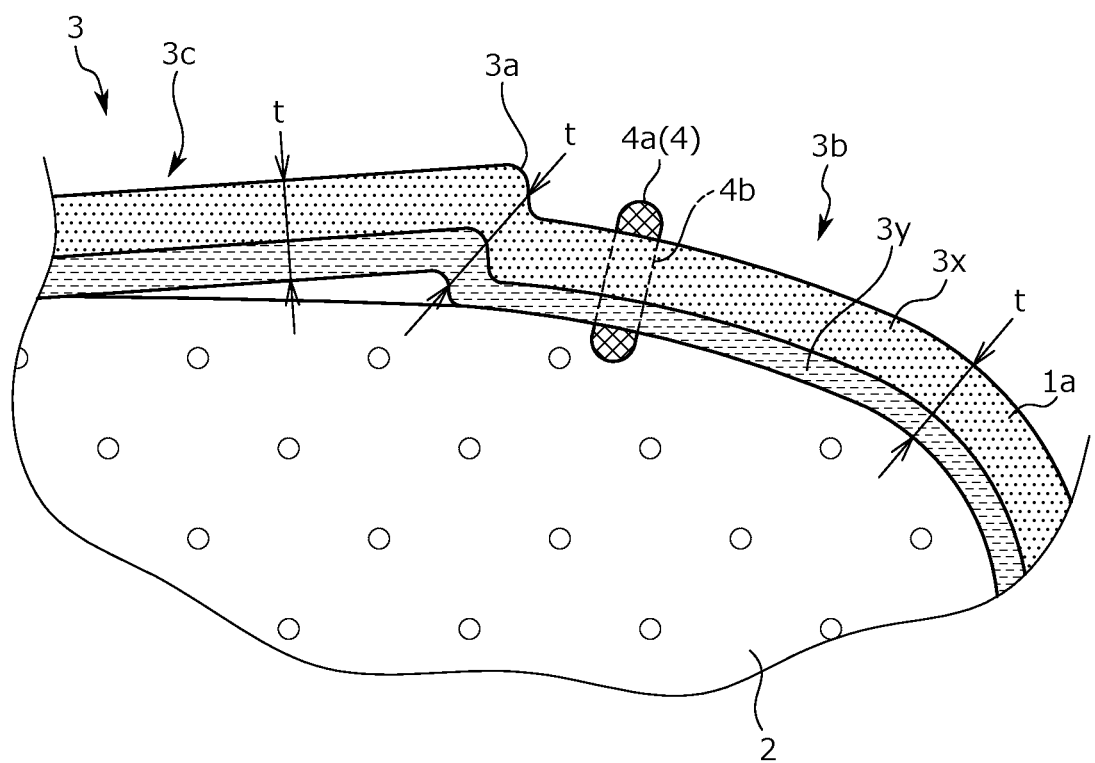
FIG. 2 is a sectional view along a II-II line of FIG. 1, the sectional view illustrating the stepped portion and the stitch line formed along the stepped portion.

FIG. 1 is a perspective view of the seat 1 according to the embodiment of the present invention, the seat 1 including a skin material 3 with a stepped portion 3a formed by transferring from a die and a stitch line 4 formed by a sewing thread 4a. FIG. 2 is a sectional view along a II-II line of FIG. 1, the sectional view illustrating the stepped portion 3a and the stitch line 4 formed along the stepped portion 3a.

The seat 1 of the present embodiment includes a standing wall 1a on each side in the seat width direction, and is formed in an inverted U-shape expanding toward the lower side as viewed from the front. Moreover, the seat 1 includes a pad 2 and the skin material 3 configured to cover the pad 2.

The skin material 3 includes the stepped portion 3a extending linearly along a peripheral edge of the seat 1, and the stitch line 4 sewed along the stepped portion 3a. The skin material 3 has a double-layer configuration of a base material 3x exhibiting stretchability and resin 3y bonded to the back side of the base material 3x. The skin material 3 is formed with a thickness of 0.9 mm. The skin material 3 is molded by a die (an air permeable die) exhibiting favorable air permeability. Note that the air permeable die is formed by electrocasting etc.

The stepped portion 3a is arranged in the vicinity of the standing walls 1a of the seat 1, and is formed with a crank-shaped section. The stepped portion 3a is formed in the vicinity of the standing walls 1a of the seat 1. This leads to a higher stereoscopic effect, and therefore, leads to a higher design effect.

Moreover, the stepped portion 3a is formed as follows: heated original fabric of the skin material 3 is pressed against a die, and vacuuming is performed between the original fabric and the die; and therefore, a stepped shape of the die is transferred by a close contact of the original fabric with the die and by preheating of the original fabric. The stepped portion 3a corresponds to a transferred extension.

Note that the thickness t of the stepped portion 3a and the periphery thereof is a constant thickness. That is, the stepped portion 3a is formed by transferring, and therefore, no thick portion due to overlapping of sewed skin pieces is caused as compared to formation by sewing of not-shown two skin pieces. Thus, only a stepped shape can be clearly seen.

Thus, it is less likely that the stepped portion 3a is caught by the buttocks or inner thighs of the seated person, and therefore, a favorable feeling of seating can be provided to the seated person.

Moreover, a sewing step for forming the stepped portion 3a is not necessary, and therefore, the number of steps can be reduced. Further, as compared to the case of forming the stepped shape by sewing, no seam allowance is necessary, and the amount of the skin material 3 to be discarded can be reduced. This can lead to a favorable yield ratio of the skin material 3.

The stitch line 4 is a line formed of a single stitch. The stitch line 4 is not formed by transferring from the die, but is formed by the sewing thread 4a. For decoration, the stitch line 4 is a line of a stitch portion formed by the sewing thread 4a in a color different from those of other portions of the skin material 3. Moreover, the sewing thread 4a is not used to sew skin pieces forming the skin material 3, but is sewn around the front and back of the single skin material 3.

For example, for coloring only a thread pattern portion by transferring from the air permeable die, a device configured to locally eject ink is necessary, and for this reason, this involves a significant cost. Moreover, due to ink properties exhibiting fluidity, it is difficult to maintain a certain level of quality. On the other hand, the sewing thread 4a in the color different from those of other portions of the skin material 3 is sewn, and therefore, outer appearance design can be easily enhanced.

In particular, the stitch line 4 is formed at a lower step 3b formed continuously to the lower side of the stepped shape of the stepped portion 3a, and therefore, it is less likely that the stitch line 4 is caught by the buttocks of the person seated on an upper step 3c formed continuously to the upper side of the stepped shape of the stepped portion 3a.

<Sewing Process>

Figure 3:
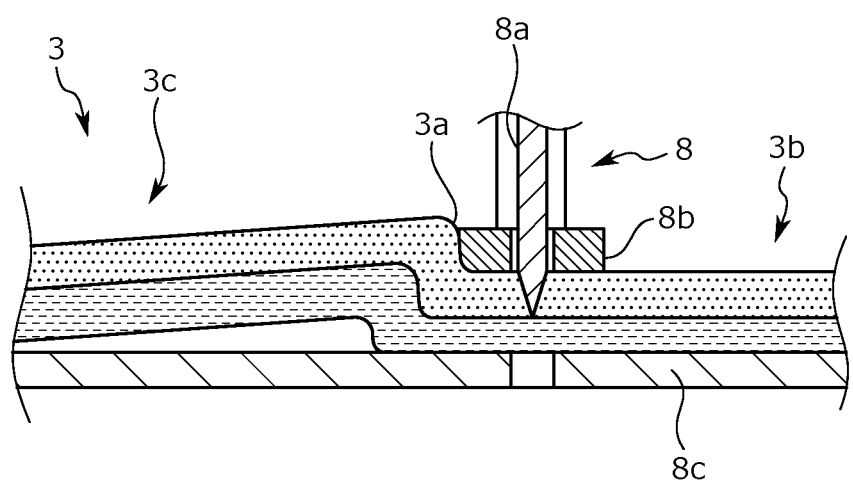
FIG. 3 is a sectional view in a state in which a sewing machine sews the skin material to form the stitch line.

Next, the process of sewing the stitch line 4 by a sewing machine 8 will be described with reference to FIG. 3. FIG. 3 is a sectional view in a state in which the sewing machine 8 sews the skin material 3 to form the stitch line 4.

The stitch line 4 is, on the outside in the seat width direction, formed on one side, i.e., the lower side in the present embodiment, with respect to the stepped portion 3a having a vertically-shifted height. Since the stitch line 4 is formed on one side with respect to the stepped portion 3a as described above, the stitch line 4 can be easily formed. Specifically, as long as a lower surface of the lower step 3b of the skin material 3 at least on one side with respect to the stepped portion 3a is in a planar shape, stable sewing can be performed in a state in which the lower step 3b is pressed by a press 8b with the lower step 3b being placed on a table 8c of the sewing machine 8. Thus, workability in formation of the stitch line 4 can be enhanced.

The stepped portion 3a serves as a guide upon formation of the stitch line 4. Specifically, a side surface of the press 8b of the sewing machine 8 is placed along the stepped portion 3a while a sewing needle 8a is reciprocating. In this manner, the stitch line 4 can be formed along the stepped portion 3a.

<Seal Material>

For the sake of convenience in formation of the stitch line 4 by the sewing thread 4a, sewing holes 4b through which the sewing thread 4a penetrates are formed at the skin material 3. Thus, the pad 2 might get wet due to entrance of liquid such as rainwater into the sewing holes 4b, and for this reason, the buttocks or inner thighs of the person seated on the seat 1 might get wet.

Figure 4:
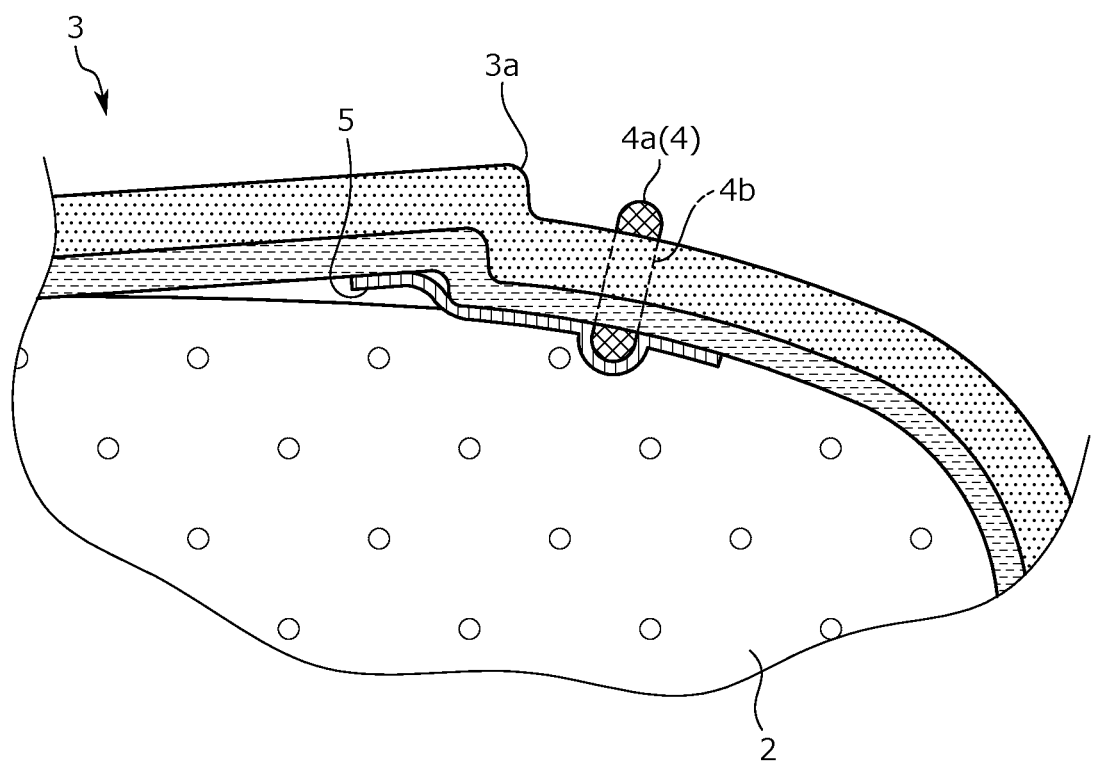
FIG. 4 is a schematic view in a state in which a seal material is bonded to a back side of the skin material to extend over a portion provided with the stitch line and a portion provided with the stepped portion.

For solving such a problem, the seat 1 includes a seal material 5 configured to cover, from the back side of the skin material 3, the sewing holes 4b formed by the stitch line 4 as illustrated in FIG. 4. FIG. 4 is a schematic view in a state in which the seal material 5 is bonded to the back side of the skin material 3 to extend over a portion provided with the stitch line 4 and a portion provided with the stepped portion 3a.

The seal material 5 is formed of a waterproof tape, and covers the stitch line 4 to extend over the stepped portion 3a on the back side of the skin material 3. Since the seal material 5 covers the stitch line 4 as described above, entrance of water into the seat 1 through the sewing holes 4b can be reduced, and therefore, this can prevent the buttocks or the inner thighs from getting wet due to water entrance.

In particular, since the seal material 5 extends over the lower step 3b of the stepped shape, a contact area between the seal material 5 and a back surface of the skin material 3 can be increased, leading to higher adhesive force. This can reduce detachment of the seal material 5 from the back surface of the skin material 3, and therefore, water entrance into the seat 1 can be stably reduced.

The seal material 5 is preferably in a tape shape because bonding is facilitated. However, e.g., quick-drying liquid may be used as a seal material.

It has been described that the stitch line 4 in the above-described embodiment is the line formed of the single stitch, but the stitch line 4 may be a line formed of double stitches.

Moreover, the stitch line 4 is preferably formed at the lower step 3b of the skin material 3 because the sewing thread 4a can be sewn with the press 8b being placed along the stepped portion 3a. However, the present invention is not limited to such a configuration. The stitch line 4 may be formed at the upper step 3c of the skin material 3, or may be formed at the lower step 3b and the upper step 3c.

Note that the seat of the present invention is applicable not only as seats for a motorcycle and a tricycle, but also as a seat for a four-wheel vehicle. The seat of the present invention is also applicable as seats for a ship, an airplane, a seat-equipped machine, and other conveyances.

What is claimed is:

1. A skin material used for a conveyance seat and molded using a die, comprising:
   a linearly-extending transferred extension having a stepped shape transferred from the die;
   a stitch line sewn along the transferred extension; and
   a seal material configured to cover, from a back side, a sewing hole formed by the stitch line,
   wherein the transferred extension serves as a guide upon formation of the stitch line, and
   a sewing thread of the stitch line is sewn around a front surface and a back surface of a single skin material.

2. The skin material according to claim 1, wherein
   a thickness of the transferred extension and a periphery thereof is a constant thickness.

3. The skin material according to claim 1, wherein
   the transferred extension is formed in a vicinity of a standing wall of the conveyance seat.

4. The skin material according to claim 1, wherein
   the stitch line is formed on one side with respect to the transferred extension.

5. The skin material according to claim 1, wherein
   the stitch line is formed at a portion formed continuously to a lower side of the stepped shape of the transferred extension.

6. The skin material according to claim 1, wherein
   the seal material covers the stitch line to extend over the transferred extension.

7. A conveyance seat comprising:
   the skin material according to claim 1.

8. A skin material used for a conveyance seat and molded using a die, comprising:
   a transferred extension that extends linearly and comprises a stepped portion having a stepped shape transferred from the die;
   a stitch line sewn along the stepped portion;
   an upper step generally horizontally extending from an upper side of the stepped portion;
   a lower step extending from a lower side of the stepped portion and vertically shifted from the upper step,
   wherein
   the transferred extension serves as a guide upon formation of the stitch line, and
   the stitch line is provided at the lower step,
   a stitched portion of the skin material at which the stitch line is sewn and a portion of the skin material around the stitched portion are portions of a single skin material.

9. The skin material according to claim 8, wherein
   a thickness of the stitched portion and a thickness of the portion around the stitched portion are same.

10. The skin material according to claim 8, wherein
    the stepped portion is formed in a vicinity of a standing wall of the conveyance seat.

11. The skin material according to claim 8, wherein
    the stitch line is formed on one side with respect to the stepped portion.

12. The skin material according to claim 8, further comprising:
    a seal material configured to cover, from a back side a sewing hole formed by the stitch line.

13. The skin material according to claim 12, wherein
    the seal material covers the stitch line to extend over the stepped portion.

14. A conveyance seat comprising:
    the skin material according to claim 8.

* * * * *